(12) United States Patent
Elias et al.

(10) Patent No.: US 7,363,054 B2
(45) Date of Patent: **\*Apr. 22, 2008**

(54) SYSTEM AND METHOD FOR WIRELESS TRANSACTIONS

(75) Inventors: Georges F. Elias, Malibu, CA (US); Demetrios Vrotsos, Titusville, FL (US)

(73) Assignee: Virtual Fonlink, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/356,496

(22) Filed: Feb. 17, 2006

(65) Prior Publication Data

US 2006/0142058 A1 Jun. 29, 2006

Related U.S. Application Data

(63) Continuation of application No. 10/081,058, filed on Feb. 22, 2002, now Pat. No. 7,003,316.

(51) Int. Cl.
*H04M 1/00* (2006.01)

(52) U.S. Cl. ............... 455/556.1; 455/557; 455/550.1; 455/575.1; 455/90.3; 455/11.1; 455/347; 455/348; 455/349

(58) Field of Classification Search ............. 455/550.1, 455/552.1, 553.1, 556.1–556.2, 557–558, 455/90.1–90.3, 11.1, 418–420, 414.1–414.4, 455/445, 347–349, 575.1; 705/42–43, 14, 705/35; 235/379–382, 462.43–462.49, 472.01–472.02

See application file for complete search history.

(56) References Cited

U.S. PATENT DOCUMENTS

| | | | | |
|---|---|---|---|---|
| 5,805,676 | A * | 9/1998 | Martino | 379/93.17 |
| 5,850,599 | A * | 12/1998 | Seiderman | 455/406 |
| 6,032,859 | A * | 3/2000 | Muehlberger et al. | 235/449 |
| 6,094,640 | A * | 7/2000 | Goheen | 705/5 |
| 6,234,389 | B1 * | 5/2001 | Valliani et al. | 235/380 |
| 6,253,998 | B1 * | 7/2001 | Ziarno | 235/380 |
| 6,260,026 | B1 * | 7/2001 | Tomida et al. | 705/38 |
| 6,754,756 | B2 * | 6/2004 | Chien et al. | 710/300 |
| 7,003,316 | B1 * | 2/2006 | Elias et al. | 455/566.1 |

(Continued)

FOREIGN PATENT DOCUMENTS

WO WO98/48522 10/1998

*Primary Examiner*—Tuan A. Tran
(74) *Attorney, Agent, or Firm*—Pillsbury Winthrop Shaw Pittman LLP

(57) ABSTRACT

Embodiments of the present invention are directed to an attachment that may be coupled to a wireless communication device, such as a cellular telephone, personal digital assistant (PDA), or the like to perform commercial or other information transactions, as well as to an apparatus, system and method for conducting such transactions. The wireless communication device generally includes an antenna that may be directly accessed by a processor in the attachment for transmission of data to a remote computer over a communication network. The attachment may also include an input device, such as a magnetic stripe reader, smartcard reader, barcode scanner, optical scanner, fingerprint scanner, proximity detector, or the like. When input is received at the input device, the input information may be sent to the attachment processor for processing and transmission to the remote computer via the antenna. The remote computer may process the received attachment-processed data and generate a response to send to the device processor.

18 Claims, 6 Drawing Sheets

U.S. PATENT DOCUMENTS

2002/0025796 A1* 2/2002 Taylor et al. ............... 455/406
2002/0037745 A1* 3/2002 Yahiro ........................ 455/557
2003/0211863 A1* 11/2003 Neifer ..................... 455/566.1
2004/0058705 A1* 3/2004 Morgan et al. .......... 455/556.1

* cited by examiner

SYSTEM AND METHOD FOR WIRELESS TRANSACTIONS

RELATED APPLICATIONS

This is a continuation of U.S. patent application Ser. No. 10/081,058, filed Feb. 22, 2002, now U.S. Pat. No. 7,003,316.

BACKGROUND

For many merchants, particularly those that conduct business while travelling or at a large facility where distributed customer service is advantageous, it is desirable to conduct point-of-sale commercial transactions. Likewise, for others, such as law enforcement officials, it may be necessary or helpful to be able to transmit information, e.g., a suspect's fingerprint or driver's license information, from a portable field device.

Previous systems designed to transmit input information to a remote location for processing a commercial transaction have largely involved non-mobile systems. For example, retail stores commonly have credit card reading terminals that a cashier can use to swipe a credit card. Information encoded in a magnetic stripe on the credit card is received by the reader and transmitted to a remote credit card processing computer over the public switched telephone network (PSTN). However, these terminals are fixed to a particular location by the need for access to PSTN connections. Accordingly, they are impractical for use in commercial transactions that take place in the field.

Attempts to incorporate the functionality of credit card readers and other input devices into wireless telephones are hampered by drawbacks in functionality, power consumption, portability and ease of use. For example, U.S. Pat. No. 5,729,591 to Bailey and assigned to Virtual Fonlink, Inc. describes a cellular telephone with an integrated magnetic stripe reader. Because in most cases, the functionality provided by the additional input devices is not used as frequently as the standard voice communication functionality of the telephone, the processing power and software required to interface with the additional input devices is not utilized during most telephone operations. Accordingly, using integrated telephones for this purpose is inordinately expensive. It is also unnecessarily unwieldy for the user to utilize the telephone for its originally intended non-transactional purpose (i.e., placing or receiving a telephone call). Moreover, if the user wishes to upgrade the telephone handset, the input devices and associated components must also be discarded.

Similar to the integrated system described in the Bailey patent, U.S. Pat. No. 5,850,599 to Seiderman, describes a cellular telephone in which a magnetic stripe reader is interposed between the handset and the transceiver. By placing the reader in this intermediate position, the user was forced to swipe a credit card in order to use the handset. This system also did not involve a modular attachment. Accordingly, a user would not be able to use the handset without the reader and would be required to replace the reader in order to upgrade the handset.

Previous systems that have incorporated input devices such as magnetic stripe readers and barcode scanners into modular attachment devices have not overcome these cost and functionality disadvantages. U.S. Pat. No. 6,234,389 to Valliani et al. describes an module that may interface with a laptop computer or personal digital assistant (PDA) through a PCMCIA interface. The module may include a magnetic stripe reader for reading standard credit cards, a smartcard reader, a PIN pad unit, a printer, a fingerprint reader and a signature capture unit. However, in both instances, data must be transferred to a processor within the main device (as opposed to the attachment) before being transmitted, either over the wireless network or the PSTN, to the remote computer. Therefore, in the system disclosed in the Valliani et al. patent, the telephone, laptop computer or PDA is still required to satisfy unnecessarily high hardware and software requirements, just as with the integrated systems.

Similarly, an attachment sold under the product name TransAKT is available from Wildcard Wireless Solutions, Inc. of Vancouver, British Columbia, Canada. The pertinent details of the operation of the TransAKT device are described in PCT Application No. PCT/CA98/00357 (International Publication No. WO 98/48522). The attachment may be coupled to the back surface of a cellular telephone and includes a PIN pad unit and two separate magnetic stripe and smartcard readers. During a transaction, the attachment reads information from a credit card, debit card or smart card using one of the two readers, encrypts the information and transmits the encrypted information to a credit card or other validation site using the voice connection previously established by the telephone. However, the attachment is still required to interface with the cellular telephone or other device through the processor of the other device. Additionally, in at least some embodiments, the attachment requires a separate antenna and/or transceiver. Both of these requirements add expense and reduce modularity of the TransAKT system.

Moreover, in both the integrated systems and the attachment systems, passing the data read in from an input device through the processor of the wireless device raises security issues. For example, in a credit card transaction, an unscrupulous merchant may be able to save a customer's credit card information to the memory in a wireless telephone, PDA or laptop computer in order to conduct future fraudulent transactions.

SUMMARY

Embodiments of the present invention are generally directed to an attachment for a telephone, personal digital assistant (PDA), or other portable wireless communication device (hereinafter referred to generically as a "wireless communication device") with a transceiver. The attachment may include a processor and one or more input devices, such as a magnetic stripe reader, smartcard reader, fingerprint scanner, optical scanner, signature pad, proximity detector, or the like. When the attachment processor receives input from one of its input devices, it may transmit the information to a remote computer using the transceiver of the wireless communication device. The information may be transmitted over a communication link with the remote computer that has already been established by a processor in the wireless communication device.

DETAILED DESCRIPTION

The present invention is directed to a system and method for transmitting data over a wireless communication network. Embodiments of the system may be used to transmit credit card information during a point-of-sale transaction, transmit fingerprint information during a traffic stop, transmit bar code information during a tour of a warehousing facility or retail location, or the like. According to embodiments of the invention, an attachment is coupled to a wireless communication device having a transceiver for establishing a communication link with a wireless communication network. The attachment may include a processor and one or more input devices. When the attachment receives data via one of the input devices, it may transmit the data over the wireless communication network using the transceiver in the wireless communication device.

Figure 1B:
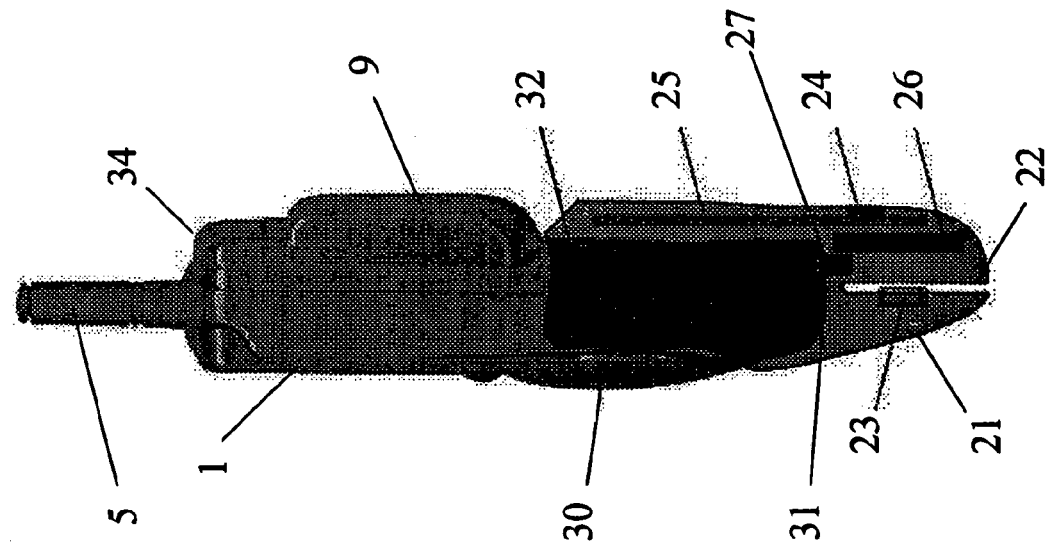
FIGS. 1A and 1B show front and side views of an attachment coupled to a wireless telephone according to an embodiment of the present invention.
Figure 1A:
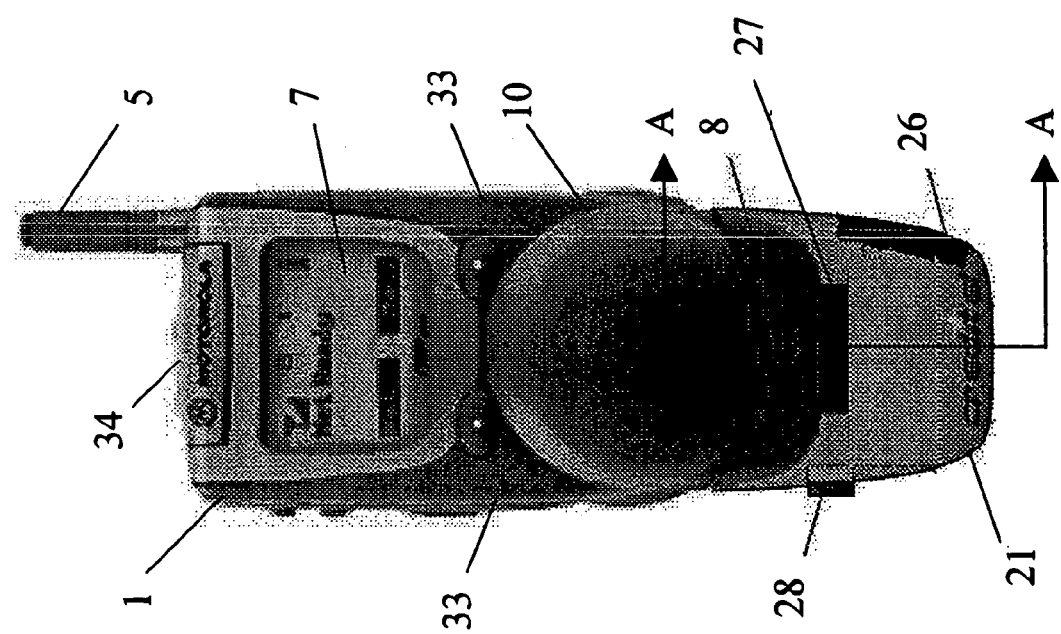
Figure 1D:
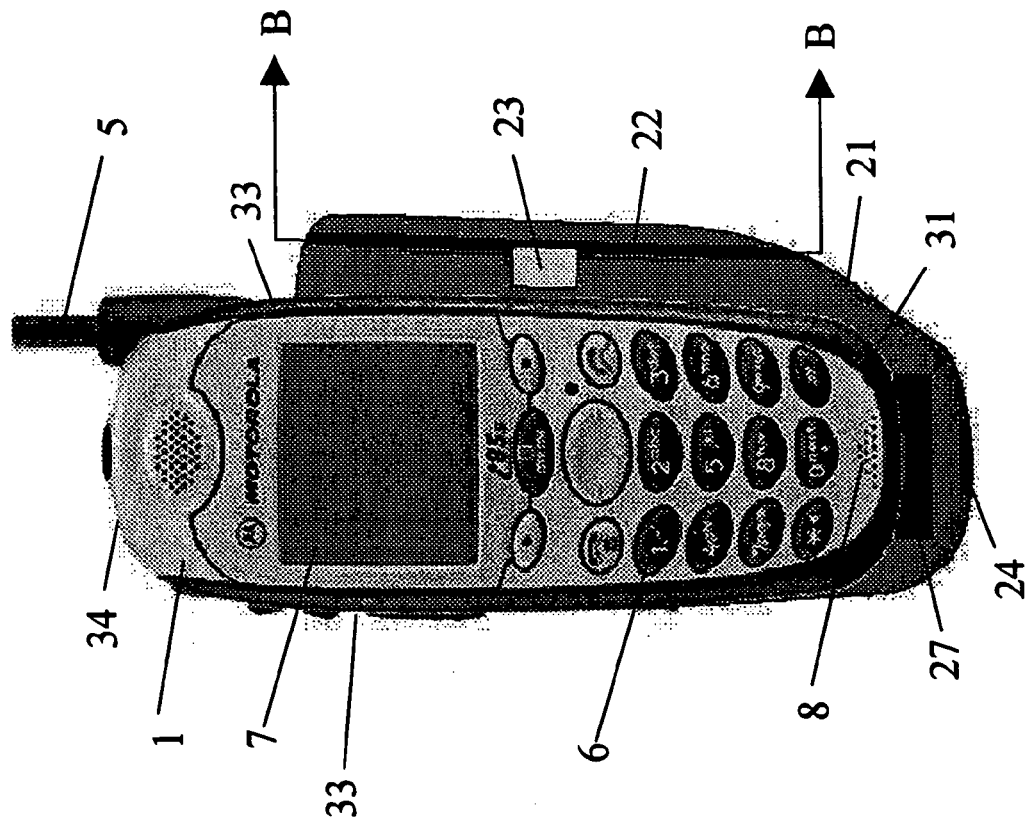
FIGS. 1C and 1D show front and side views of an attachment coupled to a wireless telephone according to an alternative embodiment of the invention.
Figure 1C:
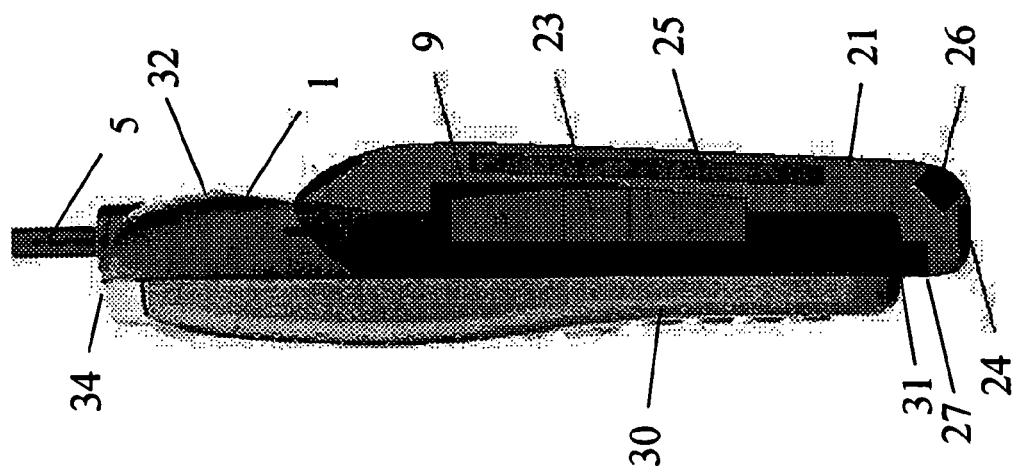

FIGS. 1A and 1B show a wireless communication device 1 and attachment 21 according to an embodiment of the invention. FIG. 1A shows a front view of the wireless communication device 1 and the attachment 21, while FIG. 1B shows a side view of the wireless communication device 1 and a cross-sectional side view of the attachment 21 taken along line A-A in FIG. 1A. Similarly, FIGS. 1C and 1D show a wireless communication device 1 and attachment 21 according to an alternative embodiment of the invention. FIG. 1C shows a side view of the wireless communication device 1 and a cross-sectional side view of the attachment 21 taken along line B-B shown in FIG. 1D. The wireless communication device 1 may be a telephone, PDA, pager, computer or other device capable of sending and receiving signals over a wireless communication network (102 in FIG. 2). Wireless communication networks may include PCS, cellular or satellite telephone networks, may transmit messages radio, infrared or other electromagnetic waves, and may utilize one or more communication protocols including Code Division Multiple Access (CDMA), Time Division Multiple Access (TDMA, including Global System for Mobile communications (GSM), Interim Standard 54 (IS-54), Interim Standard 136 (IS-136), and Cellular Digital Packet Data (CDPD)), Frequency Division Multiple Access (FDMA), WCDMA, CDMA2000, Advanced Mobile Phone System (AMPS), Narrowband Advanced Mobile Phone System (NAMPS) and the like. The wireless communication device may include an antenna 5, one or more processors (such as, a central processing unit (CPU), and/or a digital signal processor (DSP)), an outer casing 10, a power source (e.g., a rechargeable battery 9 or power adapter cable for coupling to an AC or DC fixed power source, such as an automobile cigarette lighter or a wall outlet), one or more output devices, and one or more input devices. For example, in embodiments in which the wireless communication device is a wireless telephone, speaker (not shown in FIGS. 1A and 1B because it is concealed within the "clamshell"-style outer casing 10, but shown in FIGS. 1C and 1D as 6) and liquid crystal display (LCD) 7 for communicating audio and graphical information, respectively, to a user may constitute "output devices" and microphone 8 and alphanumeric keypad (not shown in FIGS. 1A and 1B because it is concealed within a "clamshell"-style outer casing 10, but shown by reference numeral 6 in FIGS. 1C and 1D) may constitute "input devices." The wireless communication device 1 may also have a power button or other mechanism for activating the wireless communication device 1 to draw power from the battery 9, power cable or other power source.

The attachment 21 may include one or more input devices, such as a magnetic stripe reader, smartcard reader, fingerprint scanner, optical scanner, signature pad, alphanumeric keypad (such as, a PIN pad), proximity detector, audio recording device, or camera (such as, a digital or charge-coupled device (CCD) camera). In the embodiment of the attachment shown in FIG. 1, the attachment includes a magnetic stripe reader that can be used to collect information encoded in the magnetic stripe on a credit card, driver's license, or the like. The magnetic stripe reader may include a slot 22 through which the magnetic stripe-carrying card may be passed before a reader head 23 to decode the data encoded therein. The depth of the slot 22 may be chosen to correspond to the location at which magnetic stripes are commonly embedded in cards, such that placement of a card in the slot positions the magnetic stripe to be read by the reader head 23. The reader head 23 may form a portion of a side wall of the slot 22, such that the magnetic stripe of a swiped card can be read by said reader head 23. As shown, the attachment 21 also includes an infrared port 24, through which the device may receive or transmit data transmissions independent of the antenna 5 of the wireless communication device 1. In other embodiments of the invention, the infrared port 24 may be replaced with or supplemented by other data ports, such as those for receiving Bluetooth or IEEE 802.11 transmissions. The infrared port 24 may be used as an output device. For example, in embodiments of the invention, a remote computer (shown by the reference numeral 101 in FIG. 2) may transmit information (such as, a receipt for printing or a transaction record) to the attachment 21 for reformatting and retransmission to a peripheral device (such as, a printer, PDA or the like) using the infrared port 24.

Figure 3:
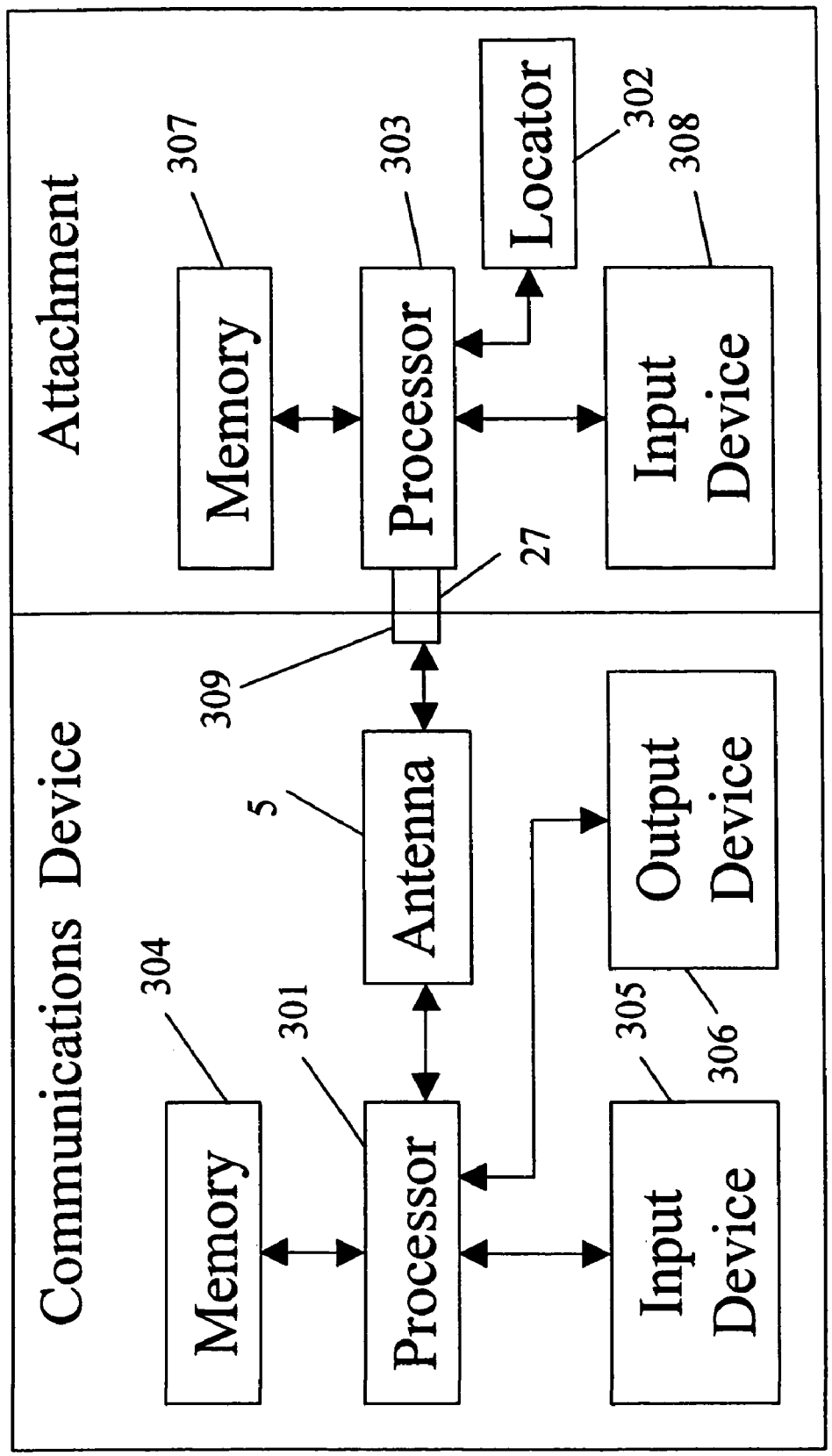
FIG. 3 shows, in block diagram form, components of the wireless communication device and the attachment according to an embodiment of the present invention.

The attachment 21 may also include an independent processor (shown in bock diagram form in FIG. 4) located on printed circuitboard (PCB) 25. The attachment 21 may be powered from the power source (battery 9) of the wireless communication device 1 or may have an independent power source, such as its own rechargeable battery (not shown), or a charging port 26 from which it may be charged by an external power source. In embodiments of the invention, the charging port 26 of the attachment 21 may be connected to a charging port of the wireless communication device 1 through the connector 27. A block diagram showing the internal components of the wireless communication device 1 and attachment 21 according to an embodiment of the invention is shown in FIG. 3. In embodiments of the invention in which the attachment 21 is powered from a rechargeable battery that is separate from a rechargeable battery 9 used to power the wireless communication device 1, both batteries may be recharged from the same charging port 26.

In the embodiment of the invention shown in FIGS. 1A and 1B, the wireless communication device 1 (shown as a wireless telephone) has an outer casing with a front surface 30, bottom surface 31, a back surface 32, two side surfaces 33 and a top surface 34. The input and output devices of the wireless communication device 1 (e.g., microphone 8, alphanumeric keypad 6, speaker and LCD 7 for the cellular telephone shown) may be provided in the front surface 30. A battery of the wireless communication device 1 may be accessible to the user from the back surface 32. The antenna 5 of the wireless communication device 1 may protrude from the top surface 34. Communication ports (e.g., an RS-232 port) and/or power transfer ports (e.g., for connection to a power cable that can be coupled to an AC or DC power source) may be provided on the bottom surface 31. It will be understood that although these various features are described as being provided on the respective surfaces of the outer casing of the wireless communication device for the illustrated embodiment, the location of a particular feature on a particular surface is generally a matter of design choice. The attachment 21 and the wireless communication device 1 may be detachably coupled by a latching mechanism, such as spring clips, screws, or other fasteners that may be selectively engaged. The attachment 21 may be detached from the wireless communication device 1 by activation of a release mechanism, e.g., pressing a release button 28 to disengage the latching mechanism. In the embodiment shown, the latching mechanism and the release mechanism (release button 28) are shown as contained in the attachment 21. However, it will be readily understood by those of skill in the art that either or both of these features may instead be contained in the wireless communication device. Furthermore, in embodiments of the invention, the latching mechanism and the release mechanism may be part of the connector 27, which is described in greater detail below.

The attachment 21 may have recessed portion with corresponding surfaces that conform to all or parts of one or more of these surfaces such that the recessed portion of the attachment 21 receives the wireless communication device 1 when the two are coupled together. For example, in the embodiment illustrated in FIGS. 1A and 1B, the attachment 21 may have a recessed portion with surfaces conforming to the bottom surface 31 and the back surface 32 of the wireless communication device 1. In such an embodiment, the slot 22 of the attachment 21 may run substantially parallel to the bottom surface 32 of the wireless communication device 1. In an alternative embodiment of the invention such as that shown in FIGS. 1C and 1D, the attachment may have surfaces that conform to the bottom surface 31, a side surface 33 and the back surface 32 of the wireless communication device 1. In such embodiments, the slot 22 may run substantially parallel to the side surface 33 of the wireless communication device. In either case, the slot 22 preferably extends from a first opening in the casing of the attachment 21 to a second opening in the casing of the attachment 21 so that a user may slide the card entirely through the slot 22 in a single swiping motion.

Figure 1E:
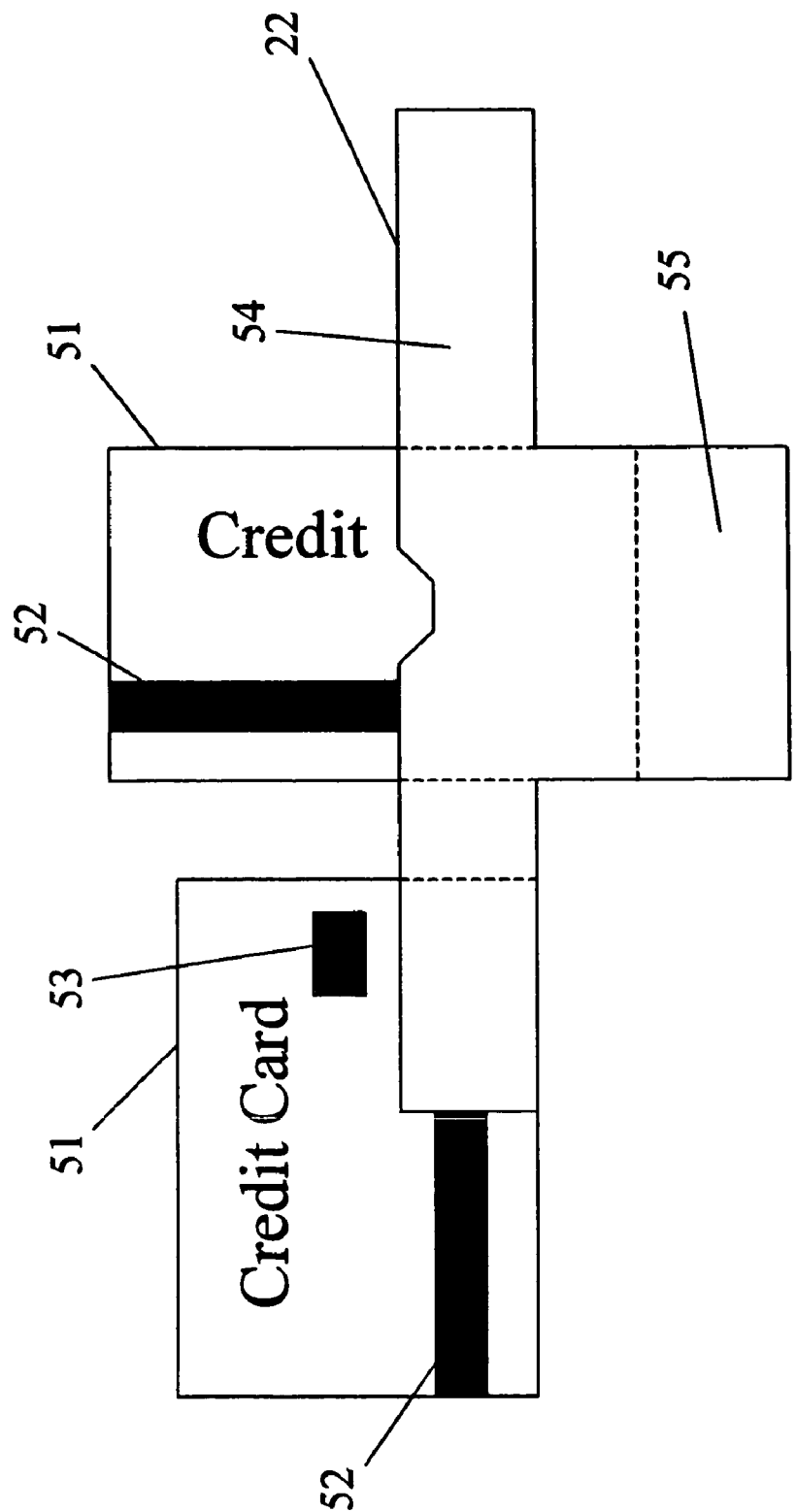
FIG. 1E shows a embodiment of a slot that may be used in an attachment according to an embodiment of the present invention.

In embodiments of the invention, the attachment 21 may have a combined magnetic stripe reader and smartcard reader. In such embodiments, the slot 22 may be as shown in FIG. 1E. A card 51 having a magnetic stripe 52 and/or smartchip 53 may be inserted into the slot 22. The slot may be shaped so as to include a shallow channel portion 54 of a depth suitable for reading a magnetic stripe 52 positioned parallel to a lateral surface of the card 51 as well as a deeper channel portion 55 of a suitable depth and width such that substantially all of the card 51 may be inserted into the slot 22 when a portion of the card 51 is inserted into the deeper channel portion 55. As shown, the deeper channel portion 55 is of a width substantially identical to the width of the card 51, such that lateral surfaces of the deeper channel portion 55 may contact the lateral surfaces of the card 51 to ensure that the smartchip 53 is in a desired location. A magnetic stripe reader head may be located within a surface of the shallow channel portion 54 so that the magnetic stripe 52 can be read as the card 51 is swiped through the shallow channel portion 54. A smartcard read/write head may be positioned within a surface of the deeper channel portion 55 of the slot 22 so that information may be read from or written to the smartchip 53 when the card is positioned within the deeper channel portion 55.

The wireless communication device 1 may have a communication port (shown generically as 309 in FIG. 3) and the attachment 21 may have a corresponding connector 27 that mate when the two are coupled together, permitting electrical signals to be passed from the attachment 21 to the wireless communication device 1 and vice versa. The surfaces of the recessed portion of the attachment 1 may act as a guide in the process of coupling the attachment 21 to the wireless communication device 1 to ensure that the connector 27 of the attachment and the communication port 309 of the wireless communication device 1 mate properly (i.e., that the connector 27 is not improperly flexed, that pins of the connector are coupled to the correct pins of the corresponding port, etc.).

In embodiments of the invention, the connector 27 of the attachment 1 may include an RS-232 serial interface connector of the type commonly used to interface modems or other peripherals with computers and other electronic equipment. However, in other embodiments of the invention, other types of serial or parallel interface connectors may be used. The communication port 309 of the wireless communication device 1 that mates with this connector 27 may be electrically coupled directly to the antenna 5. The connector 27 may also include a power transmission connector to allow operational power to be transmitted either from the wireless communication device 1 to the attachment 21 (e.g., in embodiments in which the attachment is powered by a battery of the wireless communication device 1) or from the attachment 21 to the wireless communication device 1 (e.g., in embodiments in which the charging port 26 of the attachment 21 is electrically coupled to a charging port of the wireless communication device 1). As previously mentioned, in embodiments of the invention in which the attachment 21 and the wireless communication device 1 have separate rechargeable batteries as power supplies, the charging port 26 may be used to recharge both of these batteries.

The attachment 21 may also include a Global Positioning System (GPS) locator chipset so that the location of the attachment (and thereby, the user) can be tracked from a remote computer. The GPS locator may be placed on the PCB 25. The GPS locator may send location information to a remote computer (101 in FIG. 2) periodically or upon receipt of a query from the remote computer 101. In embodiments of the invention, the location information may be used to identify fraudulent transactions. For example, if the remote computer 101 engages in two commercial transactions with the attachment 21 from geographically distant locations within a time period within which it is unlikely that the user could have traveled from the first location to the second location, the transactions may be flagged as possibly fraudulent and an administrator may be informed of the transactions for follow-up investigation.

Figure 2:
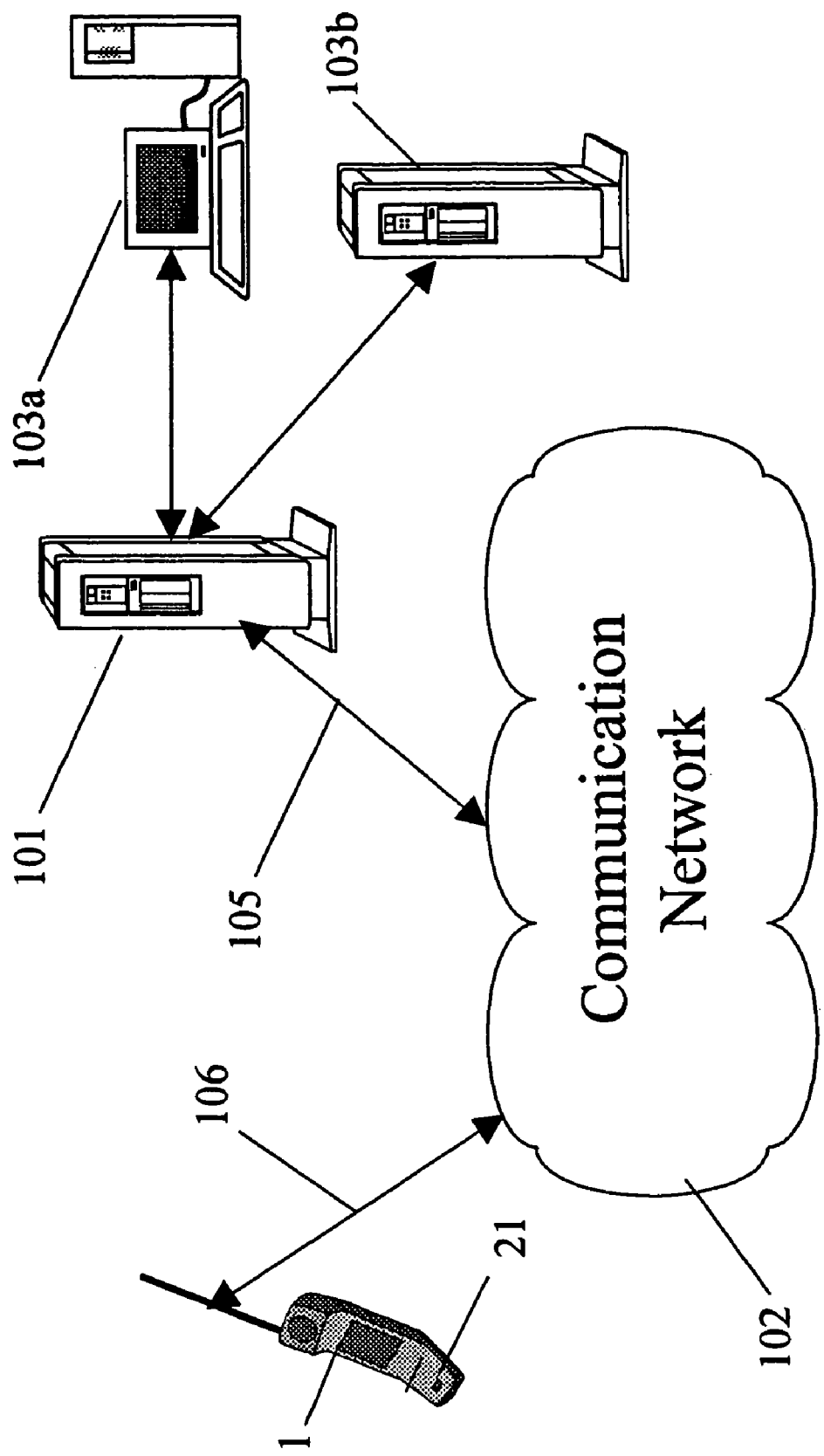
FIG. 2 illustrates a transaction system connected by a communications network that may be used in conjunction with the wireless telephone and attachment according to an embodiment of the invention.

FIG. 2 shows a wireless communication network that may be used in conjunction with the attachment and the wireless communication device. The wireless communication device 1 or attachment 21 may establish a communication link via the communication network 102 with a remote computer 101 using the antenna in the wireless communication device 1. The communication network 102 may include hardware (base stations, servers, routers, switches and the like) for establishing a communication link between the wireless communication device 1/attachment 21 and the remote computer 101. For example, in an embodiment in which the wireless communication device 1 and attachment 21 communicate with the remote computer using the Wireless Application Protocol, the communication network 102 may include a WAP gateway server that retrieves information from the remote computer 101 in Hyper-Text Transfer Protocol (HTTP) or Secure Hyper-Text Transfer Protocol (HTTP-S) format and encodes this information in Wireless Session Protocol (WSP), Wireless Transaction Protocol (WTP) and/or Wireless Transport Layer Security (WTLS) for transmission to the antenna 5 of the wireless communication device 1.

The communication sublink 106 between the communication network 102 and the wireless communication device 1/attachment 21 will be wireless, while the communication sublink 105 between the communication network 102 and the remote computer 101 and the communication sublinks between hardware components internal to the communication network 102 itself may be wireless links, land lines or a combination thereof. The "communication link" between the wireless communication device 1/attachment 21 and the remote computer 101 may therefore include portions of the communication network 102 as well as communication sublinks 105 and 106. It will be readily understood by people of ordinary skill in the art that the communication link between the wireless communication device 1/attachment 21 and the remote computer 101 may be a dynamic set of hardware components and communication sublinks. For example, in embodiments of the invention in which the communication network 102 is a packet-switched network, the communication sublinks and hardware components within the communication network 102 may change from packet to packet during the same communication session.

In embodiments of the invention, the remote computer 101 may actually be comprised of several components, such as a firewall, a gateway server, a database server, and a processing server. The firewall may be used to prevent access to the remote computer 101 by unauthorized users. Accordingly, the messages sent to the remote computer 101 may include a password or other identification information indicating the identity of the user. Access to the remote computer 101 may be denied if the message is not accompanied by a valid password or identification information. The password or identification may be validated once at the beginning of a communication session or with the receipt of each message by the remote computer 101.

The gateway server may format the incoming information and transmit it to the database server for storage. The stored information may be retrieved from the database server by the processing server. The processing server may determine when and whether additional information must be retrieved from affiliated computers 103a and 103b (e.g., information from the a user-provided computer indicating whether sufficient quantities of the product being sold are available) or when information must be sent to the affiliated computers 103a and 103b for further processing (e.g., sending credit card information to a server provided by the credit card issuer).

During the communication session with the wireless communication device 1 and/or the attachment 21, the remote computer 101 may send or receive information from one or more affiliated computers 103a and 103b. The affiliated computers 103a and 103b may be servers, workstations, terminals, or the like. For example, as described in greater detail with respect to FIG. 4, during a commercial transaction such as a purchase paid for by a credit card issued by a credit card issuer (such as a bank), the remote computer 101 may need to retrieve information related to the customer's credit limit or available credit from a server provided by the credit card issuer or may send information about the purchase price to a server provided by the credit card issuer. In an alternative example, the affiliated computer 103a and 103b may be a server provided by the merchant to determine whether the merchant has the appropriate inventory on hand to fill the customer's order. Alternatively, the affiliated computer 103a and 103b may be a workstation or terminal used by an administrator, a registered merchant or the like to access transaction records, update registration information, etc.

FIG. 3 shows a block diagram of a wireless communication device 1 and an attachment 21 according to an embodiment of the present invention. The processor 301 of the wireless communication device 1 may execute one or more software application for prompting the user for input, processing user input (received from the input device 305), transmitting and receiving information over the communication network, and outputting information to the user (via output device 306). Although only one input device 305 and one output device 306 are shown, multiple input and output devices may be provided (as described with respect to FIG. 1).

For example, where the wireless communication device 1 is a cellular telephone, the processor may process a telephone number or a personal identification number associated with a customer's credit or debit card that is input by the user through the alphanumeric keypad 9. The software application(s) executed by the processor 301 of the wireless communication device 1 may be written in the JAVA 2 Platform Micro Edition (available from Sun Microsystems, Inc. of Palo Alto, Calif.), Wireless Application Protocol (WAP) or any other suitable programming language. The software application, as well as other data, may be stored, either permanently or temporarily, in memory 304. In embodiments in which the processor 301 of the wireless communication device 1 executes a WAP application, it may receive and transmit data using one or more existing wireless services, such as Short Message Service (SMS), Circuit Switched Data (CSD), General Packet Radio Service (GPRS) or Unstructured Supplementary Services Data (USSD).

Although illustrated in FIG. 3 as single blocks, the processor 301 of the wireless communication device 1 and the processor 303 of the attachment 12 may actually incorporate multiple microprocessors and/or other electronic components, such as digital signal processors (DSP), interface controllers (e.g., to interface with the input and output devices), audio amplifiers, RF amplifiers and the like. For example, in an embodiment in which the wireless communication device 1 is a cellular telephone, the processor 301 in the wireless communication device 1 may include an A/D converter to convert audio input received at the microphone 8 to digital data, a filter to improve the quality of the digital data, and the like. Furthermore, although the antenna 5 is shown as a single block in FIG. 3, the antenna 5 may actually include microprocessors and/or other electrical components, such as digital signal processors, RF amplifiers, and the like, in addition to a physical antenna.

The attachment 21 may also include a processor 303, a memory 307 and an input device 308. The processor may execute a software application (which may be stored in the attachment memory 307) allowing the processor to receive input information from the input device 308 and process the input information to generate data for transmission to a remote computer 101 via the antenna 5 of the wireless communication device 1. By executing the software application, the attachment may determine from which input device 308 it is receiving input information (if multiple input devices are provided), encrypt the input information, append additional information indicating the identity or location of the user (using locator 302, which may be a GPS position sensor and/or processor or a processor for measuring signal strength from multiple base stations of the communication network to determine the attachments location by triangulation), divide the input information into data packets suitable for transmission over the communication network 102, etc.

In embodiments of the present invention, the processor 301 of the wireless communication device 1 and the communication port 309 that is electrically coupled to the processor 303 of the attachment 21 may be connected to the antenna 5 by a logical bus. Accordingly, each of the antenna 5, the processor 301 of the wireless communication device 1, and the communication port 309 (and/or the processor 303 of the attachment 21) may have a unique bus address. Although messages communicated over the bus may be relayed to all other components of the bus, the message may contain the bus address of the component for which the message was intended. In this way, the message is only processed by the intended component. Thus, for example, messages transmitted to the antenna 5 by a remote computer 101 may be transmitted from the antenna 5 to both the processor 301 for the wireless communication device 1 as well as the processor 303 for the attachment 21. However, if the message is intended for the processor 303 of the attachment 21 (and addressed accordingly), the message will be ignored by the processor 301 for the wireless communication device 1. In such embodiments of the system, it may be possible for the remote computer 101 to send "acknowledgement" or "ACK" messages to the attachment 21 to indicate that attachment-processed data transmitted by the attachment 21 or a portion thereof (e.g., a packet) has been properly received. The remote computer 101 may also send messages to the processor 303 of the attachment 21 to prepare the processor 303 to receive input information from a particular input device 308.

In an alternative embodiment, the processor 303 of the attachment 21 may be connected to the antenna 5 by a one-way communication link that transfers information from the processor 303 to the antenna only. The processor 303 may reset itself every time it transmits attachment-processed data to the antenna 5. In such an embodiment, the processor 303 may not need to receive an ACK message. Instead, the processor 301 of the wireless communication device 1 may determine the state of the transaction based on a response received from the remote computer 101. For example, if a credit card number is properly transmitted to the remote computer 101 and received, the remote computer 101 may return a response continuing the transaction (e.g., requesting a PIN code). However, if the credit card number is not properly received, the processor 301 of the wireless communication device 1 may not receive a response. Accordingly, it may stay in a state in which it instructs the user to input information using the attachment 21.

In embodiments of the invention, the memory 307 of the attachment 21 may be inaccessible to the user. This may serve to prevent unscrupulous users from storing and accessing sensitive information (such as purchaser credit card information) without authorization. Accordingly, the memory 307 may be read-only memory (ROM) and may be temporary (volatile) in nature. Alternatively, the attachment may have no user interface device to allow the user to access the memory 307. In such embodiments, the wireless communication device 1 may also be prevented from accessing the memory 307 of the attachment 21 as well. As discussed below, in such embodiments, the processor 303 of the attachment 21 may encrypt input information received from the attachment's input device 308 so that the resulting attachment-processed data cannot be read off the antenna by the processor of the wireless communication device 1 (or the logical bus) for misuse by the user.

Figure 4:
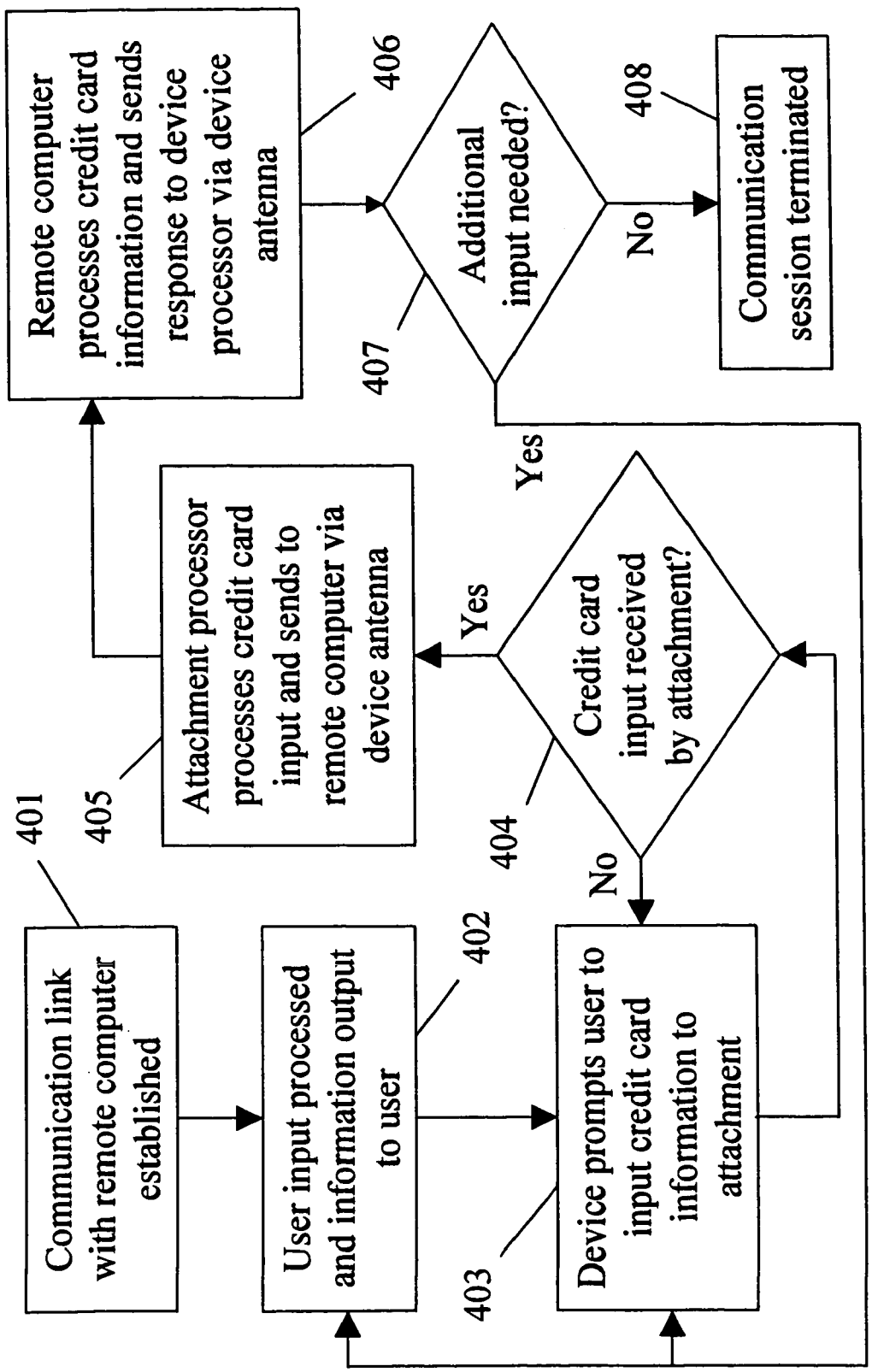
FIG. 4 shows a flowchart for a credit card purchase transaction that may be performed using the attachment, a wireless communication device and a transaction system according to an embodiment of the invention.

FIG. 4 is a flowchart showing the steps involved in an exemplary credit card purchase transaction using a wireless communication device 1 and attachment 21 in a system such as that shown in FIG. 2 according to an embodiment of the invention. Although the commercial transaction may begin with several preliminary steps (e.g., showing the customer merchandise, agreeing on a purchase price, etc.), the portion of the transaction involving the communication of information over the communication network 102 effectively begins when a communication link is established between the remote computer 101 and the wireless communication device 1 (block 401). The wireless communication device 1 preferably establishes the communication link upon the receipt of a command or input from the user. However, in alternative embodiments, the remote computer 101 may establish the communication link, for example, by periodically polling the wireless communication device 1 and maintaining the communication link if the wireless communication device 1 indicates that it has information to transmit. In embodiments of the invention, the user may input information indicating where the remote computer 101 may be accessed (e.g., a telephone number associated with a modem attached to the remote computer 101 or a uniform resource locator (URL) that can be converted into a network address through a look-up tables known to components within the communication network 102). In an alternative embodiment, the wireless communication device 1 may resent the user with a graphical user interface with pull-down menus or the like indicating the actions the user may choose to take. In such an embodiment, the user may command the wireless communication device 1 to establish the communication link with the remote computer 101 by selecting a corresponding command from one of the pull-down menus.

The step of establishing a link between the wireless communication device 1 and the remote computer 101 may further involve authenticating the user's identity and/or determining that the user is authorized to access and interact with the remote computer 101. To this end, the wireless communication device 1 may seek additional user input (block 402) and process this input or send the input to the remote computer 101 for processing. For example, in embodiments in which the remote computer 101 is accessible only to registered merchants, the wireless communication device 1 may prompt the user for a registration number or other identifying information (e.g., the name of the user). In other embodiments, the user may be prompted to input information about the product and quantity thereof to be purchased (e.g., a SKU number) and this information may be transmitted to the remote computer 101 for processing so that the user can determine, for example, whether sufficient quantities of the product are in stock. In alternative embodiments of the invention, the user may alternatively use an input device in the attachment 21, such as a barcode reader, to transmit this information to the remote computer 101 in blocks 403 to 405 of the illustrated flowchart.

User input that is received by the processor 301 of the wireless communication device 1 may be processed locally by the processor 301, be transmitted to the remote computer 101 for processing, or both. For example in embodiments of the invention, if the user inputs the quantity of a product to be purchased, the processor 301 of the wireless communication device may process this information to calculate a total purchase price based on a unit price for the product stored in the memory 304 of the device. Similarly, the quantity information may be transmitted to the remote computer 101 to determine whether sufficient quantities of the product are available. The remote computer 101 may return a response to the processor 303 of the wireless communication device 1 indicating either the total available quantity of the product or simply whether there is a sufficient quantity of the product available.

In block 403, the user may be prompted to input information using an input device of the attachment 21. For example, in the credit card purchase transaction, the wireless communication device 1 may display a message on LCD 7 instructing the user to swipe the purchaser's credit card using a magnetic stripe reader, smartcard reader or other input device associated with the attachment 21. Alternatively, the processor 301 of the wireless communication device 1 may use a different output device 306 to prompt the user to use the input device 308 of the attachment 21. For example, the processor 301 may cause a recorded audio message to be played by a speaker. If input is received at the input device (decision block 404), the processor 303 of the attachment may be awoken from a "sleep" state (e.g., a low-power wait mode) and begin to execute instructions to receive the input information. The processor 303 of the attachment 21 may then process this input information (block 405) and the resulting data may be directly transmitted to the antenna 5 of the wireless communication device for transmission to the remote computer 101. In order to transmit the attachment-processed data to the remote computer 101, the attachment 21 may establish a second communication link with the remote computer independent of the communication link previously established between the wireless communication device 1 and the remote computer 101 in step 401. Alternatively, the attachment 21 may transmit the attachment-processed data to the remote computer 101 using the communication link previously established between the remote computer 101 and the wireless communication device 1.

The processing performed by the processor 303 of the attachment 21 may include encrypting the information, dividing the input information into data packets, appending header information to the input information to indicate the identity and/or location of the user, etc. In embodiments of the invention in which the attachment 21 includes multiple input devices, the processor 303 of the attachment 21 may encrypt the input information differently depending on from which input device the input information was received. Furthermore, in embodiments of the invention, the attachment may retrieve from the remote computer 101 one or more encryption keys (public or private) for use in encrypting the input information. The retrieval of encryption keys may be performed once, with each transaction or periodically depending on the type of encryption system used.

The remote computer 101 may receive the attachment-processed data in the course of its communication session with the wireless communication device 1, i.e., the attachment-processed data may be sent to the remote computer 101 over the communication link previously established by the processor 301 of the wireless communication device 1. Alternatively, the attachment 21 may create a separate communication link from that established by the wireless communication device 1. In such embodiments, an application being executed by the wireless communication device 1 may be temporarily suspended by its processor 301 while the antenna 5 is being used by the processor 303 of the attachment 21. In embodiments of the invention, the processor 301 may suspend the application it is executing when it outputs a prompt to the user to enter input to the attachment 21. The processor 301 may resume the application being executed by processor 301 of the wireless communication device 1, for example, when the processor 301 senses that the antenna 5 is unoccupied for a specified period of time. Alternatively, in embodiments of the invention in which one application is suspended to allow the other to be executed, suspension and resumption of the application being executed may be controlled by the remote computer 101 through signals sent to the antenna 5 addressed to the processor 301 of the wireless communication device 1. Such embodiments of the invention may also involve the use of different communication protocols for a communication link established between the wireless communication device 1 and the remote computer 101 and a communication link established between the attachment 21 and the remote computer 101. For example, the communication link between the wireless communication device 1 and the remote computer 101 may be selected to transmit voice and DTMF tone data while the communication link between the attachment 21 and the remote computer 101 may be selected to transmit data (e.g., a WAP communication link). In an alternative embodiment of the invention, resumption of an application being executed by the wireless communication device 1 may be triggered by the receipt of an input from the user through an input device of the wireless communication device 1 (e.g., the alphanumeric keypad 6 or microphone 8).

If the attachment-processed data is an encrypted form of input information corresponding to the prospective purchaser's credit card information, the remote computer 101 may decrypt the attachment-processed data accordingly, determine the identity of the credit card issuer, and access an affiliated computer 103a or 103b provided by the credit card issuer to determine whether the account number provided is valid. Later during the communication session, the processor 301 of the wireless communication device 1 may transmit to the remote computer 101 the total purchase price, and the remote computer 101 may access the affiliated computer 103a or 103b provided by the credit card issuer to determine whether the purchaser is authorized by the credit card issuer to make a purchase in that amount and, if so, to instruct the credit card issuer to bill the purchaser in that amount. Once this processing is completed, the remote computer 101 may generate a response for transmission to the processor 301 of the wireless communication device 1. This response may indicate, for example, that the transaction could not be completed because completing the purchase would cause the purchaser to exceed the credit limit associated with the purchaser's credit card, that the transaction was completed satisfactorily, or that additional information is required from the purchaser or user.

If additional input is needed to complete the transaction (decision block 407), the application executed by the processor 301 may return to blocks 402 or 403, depending on the type of input needed. For example, if the remote computer 101 needs the purchaser to input a personal identification number (PIN) known to the credit card issuer to validate the credit card, the processor 301 of the wireless communication device 1 may prompt the user or purchaser to enter this information through an input device 305 (such as, an alphanumeric keypad) associated with the wireless communication device 1 (in block 402). Alternatively, if, for example, a fingerprint is used for validation, the processor 301 may display a message on the LCD 7 of the wireless communication device 1 instructing the user to input a fingerprint, and the user may input a fingerprint to a fingerprint scanner or other input device 308 associated with the attachment 21. Or if the purchaser's signature is required for storage to authenticate and verify the purchaser's assent to a charge being billed to the credit card, the processor 301 of the wireless communication device 1 may prompt the user to enter a signature using an input device, such as a signature reader or optical scanner, associated with the attachment 21 (in block 403).

It should be noted that although block 403, in which the user is prompted to input information through an input device 308 associated with the attachment 21, is shown as being performed after the user inputs information to the processor 301 of the wireless communication device 1, information may be input either through the attachment 21 or the wireless communication device 1 at various points during the transaction and it will be understood that one need not precede the other. Furthermore, the steps of receiving and processing input from either the attachment 21 or the wireless communication device 1 may be repeated several times.

A wireless transaction may also involve additional steps, such as outputting transaction information to the user. This may be accomplished by the remote computer 101 transmitting information to either the wireless communication device 1 or the attachment 21 for output. In an embodiment in which such information is transmit to the attachment 21, the remote computer 101 may send a file representing a transaction receipt to the attachment 21. The attachment 21 may reformat the file for output using one of its output devices, e.g., infrared port 24. The attachment 21 may then transmit the file to a peripheral device, such as a printer so that the receipt may be printed for a user. In an alternative embodiment, the remote computer 101 may transmit receipt-related information to the wireless communication device 1 and the wireless communication device 1 may relay this information to the user using one of its output devices, e.g., the LCD 7 or speaker).

Other transactions may also be performed using the system of the present invention. For example, during a traffic stop, a police officer may swipe a driver's license using a portable communication device 1 and an attachment 21. The driver's license information may be read by a magnetic stripe reader associated with the attachment 21. This input information may be encrypted and otherwise processed by the processor 303 of the attachment 21 and sent to a remote computer 101 provided by the police organization or another state agency (such as, the Department of Motor Vehicles). The remote computer 101 may return information regarding the driver's previous citation history, available court dates, verification of the driver's identity, etc.

While the description above refers to particular embodiments of the present invention, it should be readily apparent to people of ordinary skill in the art that a number of modifications may be made without departing from the spirit thereof. The accompanying claims are intended to cover such modifications as would fall within the true spirit and scope of the invention. The presently disclosed embodiments are, therefore, to be considered in all respects as illustrative and not restrictive, the scope of the invention being indicated by the appended claims rather than the foregoing description. All changes that come within the meaning of and range of equivalency of the claims are intended to be embraced therein.

What is claimed is:

1. A wireless communication apparatus for transmitting information to and receiving information from a remote computer over a communication network, said wireless communication apparatus comprising:
   a wireless communication device having an antenna, a device processor, an outer device casing, a communication port, and an output device; and
   an attachment having an attachment processor, a first input device, a connector, and an outer attachment casing, said attachment being removably coupled to said wireless communication device, wherein
   said connector mates with said communication port when said attachment is coupled to said wireless communication device,
   said attachment processor is configured to communicate signals to said antenna, and a first application being executed by said device processor of the wireless communication device is suspended while a second application is executed by said attachment processor.

2. The apparatus according to claim 1, wherein said wireless communication device is one of a wireless telephone, a personal digital assistant, or a computer.

3. The apparatus according to claim 1, wherein said first input device is one of a magnetic strip reader, a smartcard reader, an optical scanner, a fingerprint scanner, a signature pad, or a proximity detector.

4. The apparatus according to claim 3, wherein said first input device is a magnetic stripe reader, said magnetic stripe reader having a slot and a reader head, said slot extending from a first opening in said outer casing of said attachment to a second opening in said outer casing of said attachment, and wherein said reader head forms a portion of a side wall of said slot.

5. The apparatus according to claim 4, wherein said slot is substantially parallel to a bottom surface of said outer casing of said wireless communication device.

6. The apparatus according to claim 4, wherein said slot is substantially parallel to a side surface of said outer casing of said wireless communication device.

7. The apparatus according to claim 4, further including a second input device, wherein said first input device is a magnetic stripe reader and said second input device is a smartcard reader, and further wherein said slot includes a shallow channel portion through which a portion of a card bearing a magnetic stripe may be swiped and a deeper channel portion of sufficient depth to permit a card bearing a smartchip to be inserted into said slot.

8. The apparatus according to claim 1, said attachment processor adapted to process input information received from said input device to generate attachment-processed data to send to said antenna for transmission to a remote computer.

9. The apparatus according to claim 8, wherein said attachment-processed data is generated by at least one of encrypting said input information, dividing said input information into data packets, or creating header information to append to said input information.

10. The apparatus according to claim 1, said attachment further including a second input device.

11. The apparatus according to claim 10, wherein said second input device is one of a magnetic strip reader, a smartcard reader, an optical scanner, a fingerprint scanner, a signature pad, or a proximity detector.

12. The apparatus according to claim 10, said attachment processor adapted to process input information received from said first input device in a first manner and adapted to process input information received from said second input device in a different second manner, such that a remote computer to which processed data from said attachment processor is sent can determine whether said attachment processor received said input information from said first input device or said second input device.

13. The apparatus according to claim 1, said attachment further including an attachment memory encoded with instructions to be executed by said attachment processor.

14. The apparatus according to claim 13, wherein said attachment processor begins executing said instructions when input information is received at said input device.

15. The apparatus according to claim 1, wherein said device processor establishes a communication link with a remote computer using said antenna and said attachment processor receives input information from said first input device, processes said input information to generate attachment-processed data, and sends said attachment-processed data to said remote computer using said antenna over said communication link.

16. The apparatus according to claim 1, further including a data port for receiving and transmitting data independent of said antenna.

17. The apparatus according to claim 16, wherein said data port receives and transmits at least one of infrared, IEEE 802.11 and Bluetooth signals.

18. The apparatus according to claim 1, wherein a first communication link established between said attachment and a remote computer over a communication network is separate from a second communication link established between said wireless communication device and said remote computer.

* * * * *